(12) United States Patent
Lee et al.

(10) Patent No.: US 7,111,948 B2
(45) Date of Patent: Sep. 26, 2006

(54) ADJUSTING STRUCTURE OF PROJECTOR

(75) Inventors: Sea-Huang Lee, Chu-Nan (TW);
Wen-Ching Ho, Chu-Nan (TW);
Shou-Chih Chen, Chu-Nan (TW)

(73) Assignee: Coretronic Corporation, Miao-Li (TW)

( * ) Notice: Subject to any disclaimer, the term of this patent is extended or adjusted under 35 U.S.C. 154(b) by 86 days.

(21) Appl. No.: 10/944,771

(22) Filed: Sep. 21, 2004

(65) Prior Publication Data
US 2005/0078283 A1 Apr. 14, 2005

(30) Foreign Application Priority Data
Oct. 9, 2003 (TW) .............................. 92128250 A

(51) Int. Cl.
G03B 21/14 (2006.01)
G03B 21/22 (2006.01)
G03B 21/00 (2006.01)

(52) U.S. Cl. ........................................ 353/119; 353/70
(58) Field of Classification Search ................ 353/69, 353/70, 119
See application file for complete search history.

(56) References Cited

U.S. PATENT DOCUMENTS 6,719,431 B1 * 4/2004 Liu et al. ...................... 353/70
6,789,904 B1 * 9/2004 Chang ......................... 353/119
6,793,348 B1 * 9/2004 Lee et al. .................... 353/119
6,796,538 B1 * 9/2004 Hsu et al. ................. 248/188.2
6,994,440 B1 * 2/2006 Rogers et al. .............. 353/119

* cited by examiner

*Primary Examiner*—Melissa Jan Koval
*Assistant Examiner*—Andrew Kong
(74) *Attorney, Agent, or Firm*—Bacon & Thomas, PLLC

(57) ABSTRACT

An adjusting structure of projector includes a base, a slider, a foot member and a controller. The slider is disposed on the base and has an opening. The foot member is installed through the opening of the slider. One end corresponding to the foot member and the slider is respectively disposed a plurality of groove and a blocker. The top of the controller has an inclined part that presses against an inclined plane on one side of the slider. When a user presses the controller, the inclined part pushes the inclined plane of the slider, making the slider slide along one axis to make the blocker separated from the grooves in a parallel direction. A pressing member moves the projector upward or downward along the foot member to a predetermined location, and then the pressing member is released and returns by the elastic member.

7 Claims, 11 Drawing Sheets

ADJUSTING STRUCTURE OF PROJECTOR

FIELD OF THE INVENTION

The present invention relates to a projector, and more particularly to an adjusting structure of a projector.

BACKGROUND OF THE INVENTION

A projector is usually placed on a table, and projects an image on a screen by means of a projection lens. As the location and the size of a screen varies, there is a need to adjust the height of a projector by means of an adjusting structure in order to project an image on a proper location of a screen.

As shown in FIG. 1, the adjusting structure of a conventional projector 1 is a threaded shaft 11 located at both sides of the projector 1 for supporting the projector 1 on a table 2, and the height of the projector 1 is adjusted by rotating the threaded shaft 11, so as to project an image on a screen (not shown in the figs) by means of a projection lens 12. However, the projector 1 elevates or descends only one pitch by rotating the threaded shaft 11 one cycle. A user needs to rotate the threaded shaft 11 many cycles and only elevate or descend the height of the projector 1 slightly. The adjusting speed is quite slow and it takes plenty of time to adjust the projector 1 to a predetermined height. Besides, there is a friction between the threaded shaft 11 and the table 2 due to the weight of the projector 1, and a user must overcome the friction before rotating the threaded shaft 11. This makes adjusting more laborious.

FIG. 2A and FIG. 2B are the perspective view and the vertical view showing another conventional projector adjusting structure 13. An adjusting button 131 is disposed on one side of a foot member 132 and is connected with a fixing member 133. The fixing member 133 is provided with a protruding member 1331 which can be engaged with a toothed member 1321 on the foot member 132. An elastic member 135 is disposed between another side of the fixing member 133 and a main body 134. When pressing the adjusting button 131, the adjusting button 131 drives the fixing member 133 to draw back toward the main body 134, and the protruding member 1331 is separated from the toothed member 1321. This makes the foot member 132 expand or contract in the vertical direction, so as to adjust the height of the projector. After adjusting, the adjusting button 131 is released, and the fixing member 133 returns to be engaged with the toothed member 1321 by means of the elastic member 135. However, because the adjusting button 131 is disposed on one side of the fixing member 133, when pressing on an unbalanced position of the adjusting button 131, the fixing member 133 pivots on the elastic member 135, causing the fixing member 133 to have a one-sided inclination (as noted by dotted lines). This makes the protruding member 1331 unable to be separated from the toothed member 1321 in a parallel direction, and it takes more efforts to make the protruding member 1331 separated from the toothed member 1321 in order to adjust the height of the projector. Besides, when pressing the adjusting button 131 backwards with one hand, the other hand must stabilize and move the projector, resulting in the difficulty while adjusting.

Therefore, the height-adjusting method of a conventional projector still has problems such as requiring strenuous effort when adjusting, slow adjusting speed, and one-sided inclination.

SUMMARY OF THE INVENTION

One object of the present invention is to provide an adjusting structure of a projector, utilizing the installation of a slider and a controller, wherein the controller pushes the slider to slide along a single direction, causing a blocker to be separated from grooves in a parallel direction in order to avoid one-sided inclination.

Another object of the present invention is to provide an adjusting structure of a projector, utilizing an inclined part of a pressing member and an inclined plane of a slider to operate in coordination, causing the projector to move in the same direction as the pressing direction, so as to attain an easy and effortless control on the projector.

Still another object of the present invention is to provide an adjusting structure of a projector, utilizing a pressing way to control, and adjusting the projector by sliding relatively to a foot member, in order to attain an increase in adjusting speed.

For attaining the objectives mentioned above, the adjusting structure of a projector according to the present invention includes a base, a slider, a foot member and a controller. The slider is disposed on the base and has an opening. The foot member is installed through the opening of slider, and one side thereof is provided a plurality of grooves opposite to a blocker. The controller has an inclined part on its top, and the inclined part pushes an inclined plane of the slider. When a user presses the controller, the inclined part on the controller's top pushes the inclined plane of the slider, causing the slider to slide along a single direction, and makes the blocker to be separated from the grooves in a parallel direction. Then, utilizing a pressing member to shift up and down the projector along the foot member to a predetermined position, and releasing the pressing member to reposition by means of an elastic member, in order to attain an easy and effortless control on projector height adjustment, and avoid one-sided inclination.

DETAILED DESCRIPTION OF THE PREFERRED EMBODIMENT

Figure 1:
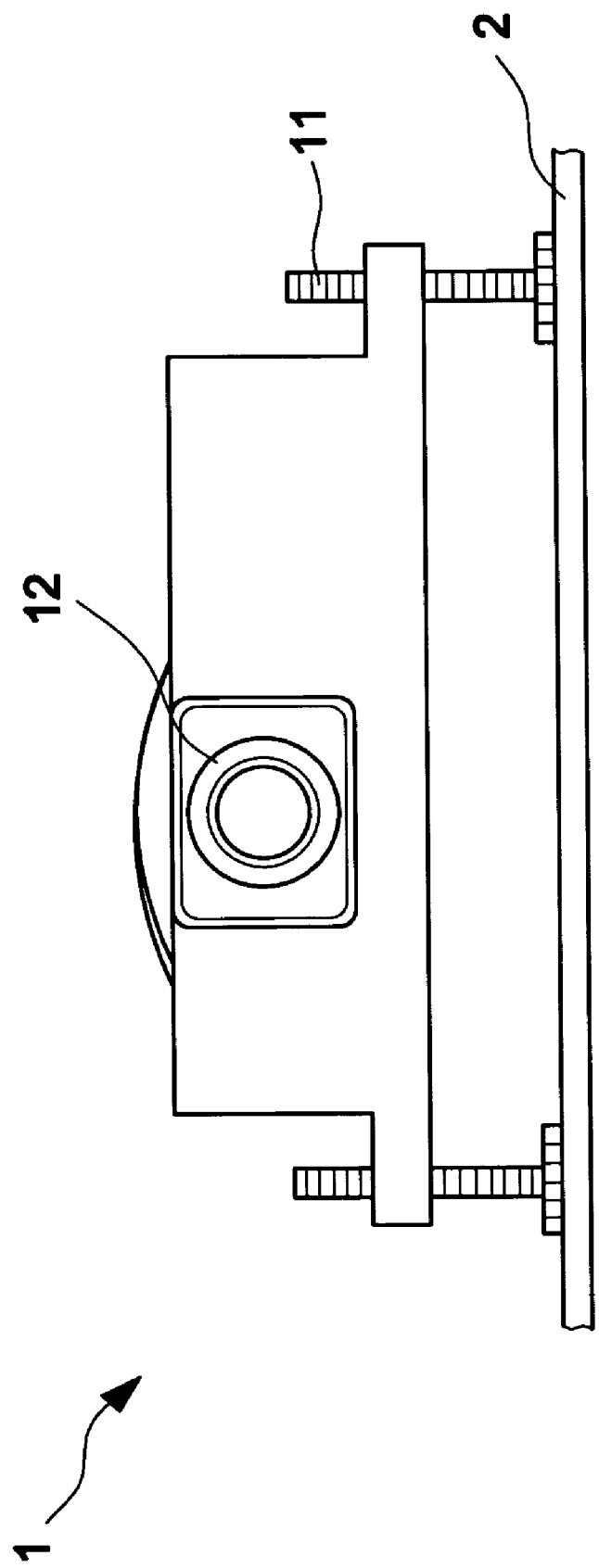
FIG. 1 is a plan view showing an adjusting structure of a conventional projector.
Figure 2A:
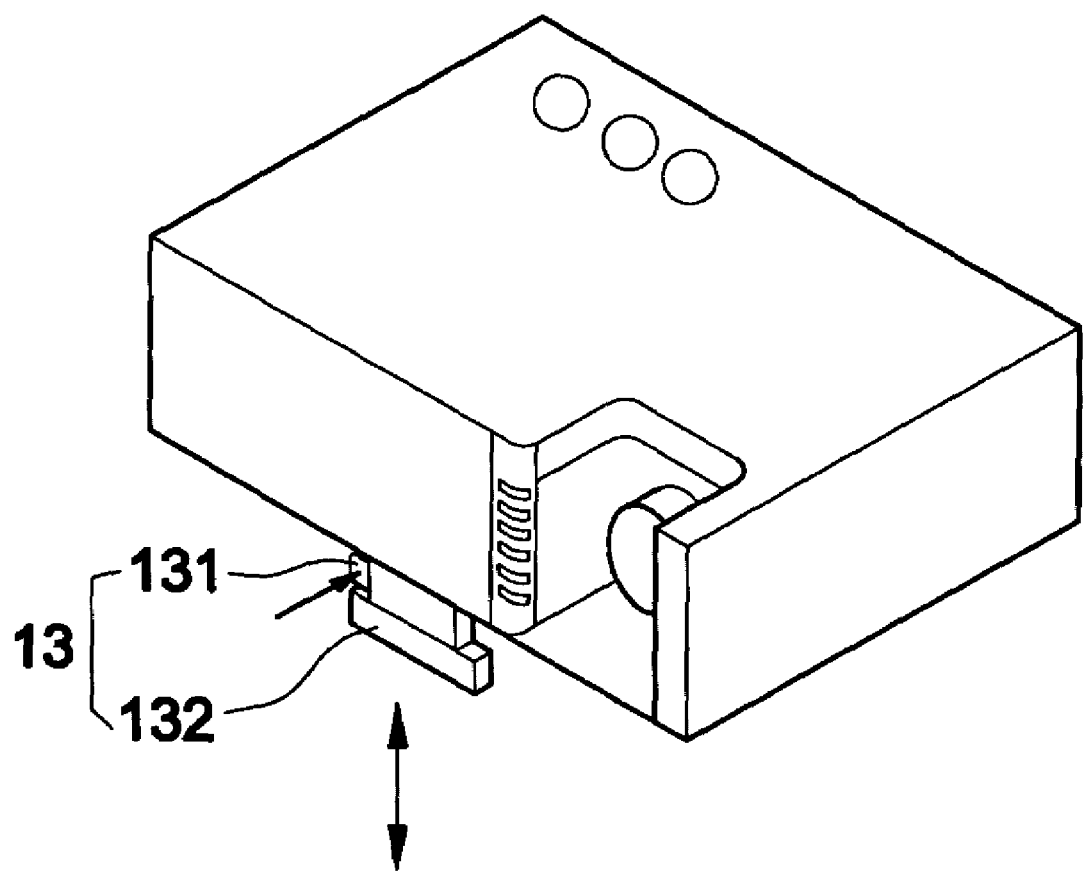
FIG. 2A is a perspective view showing another conventional adjusting structure of a projector.
Figure 2B:
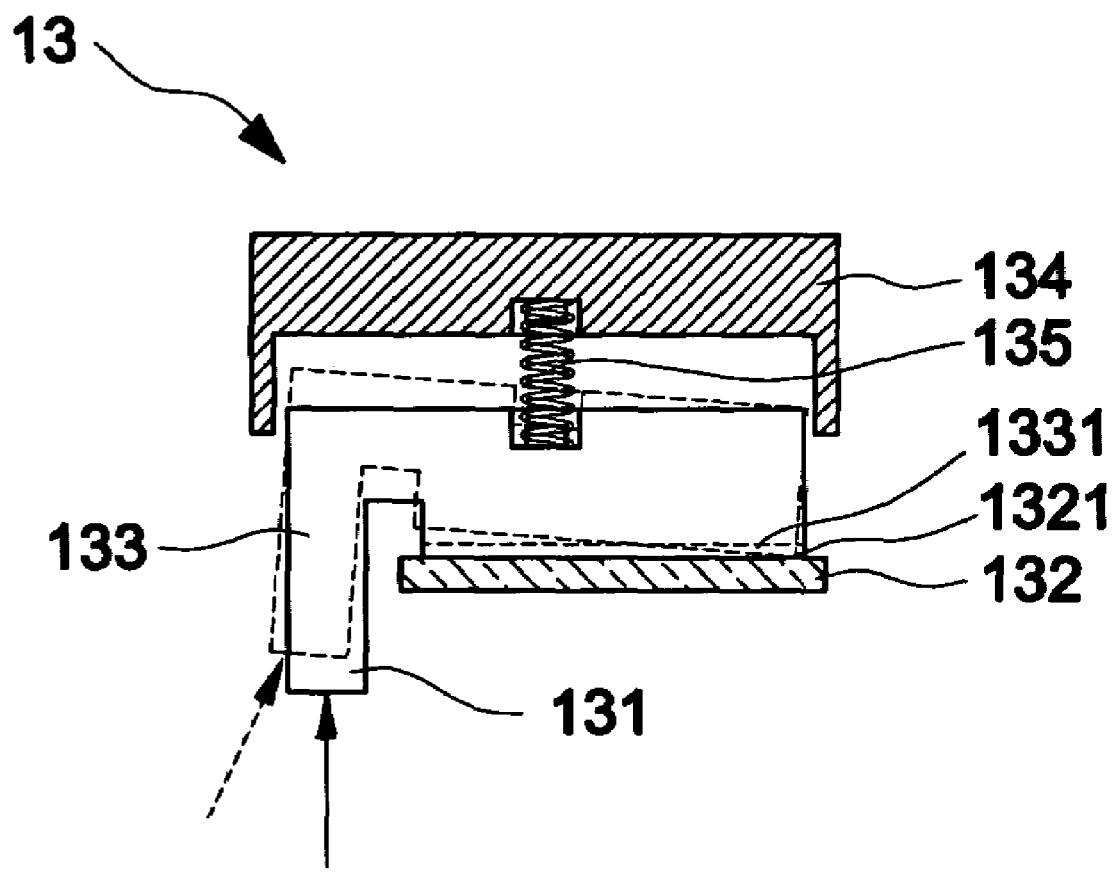
FIG. 2B is a plan view showing the conventional adjusting structure of a projector in FIG. 2A.
Figure 3:
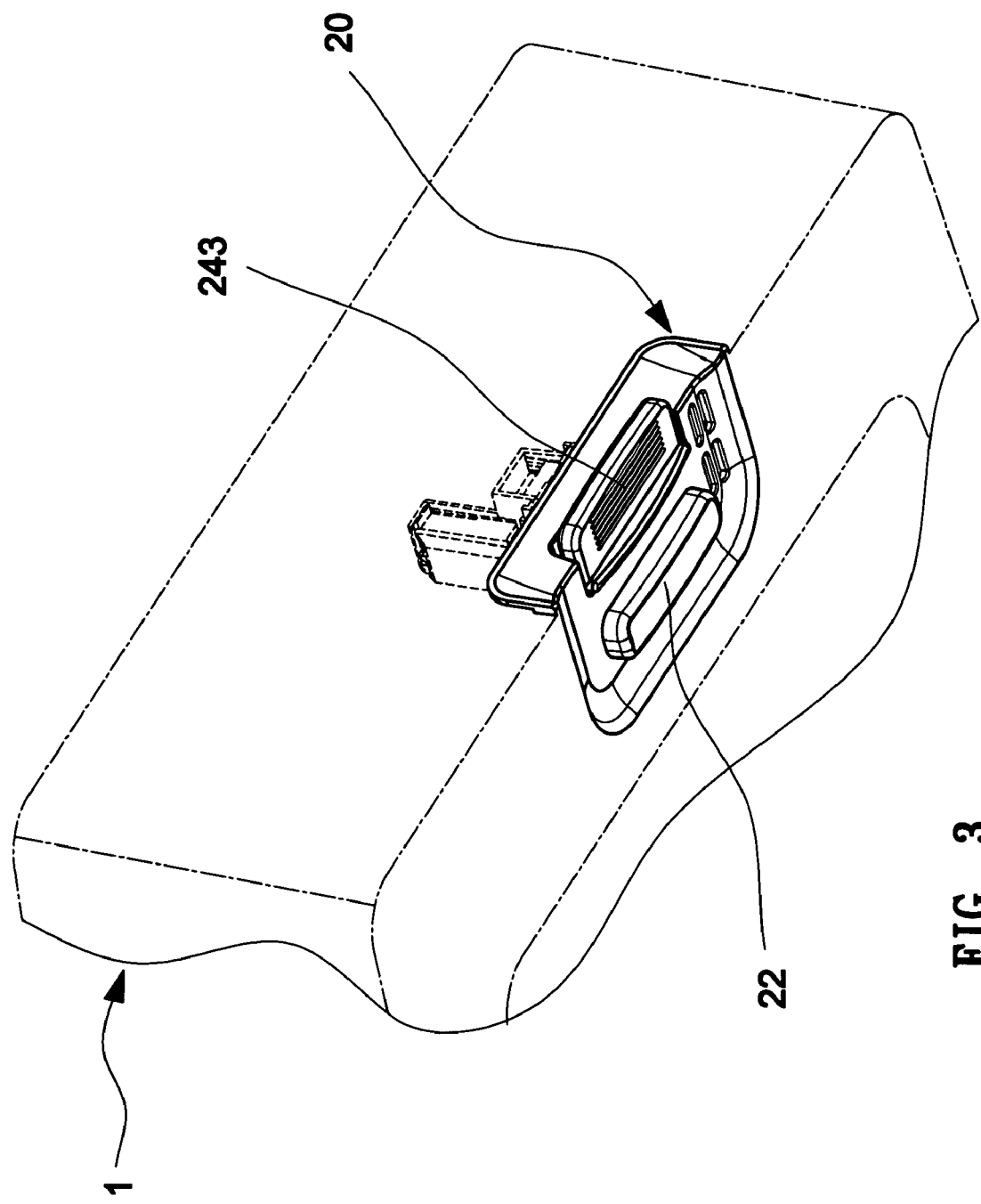
FIG. 3 is a schematic diagram showing a combination of an adjusting structure and a projector according to the present invention.
Figure 4:
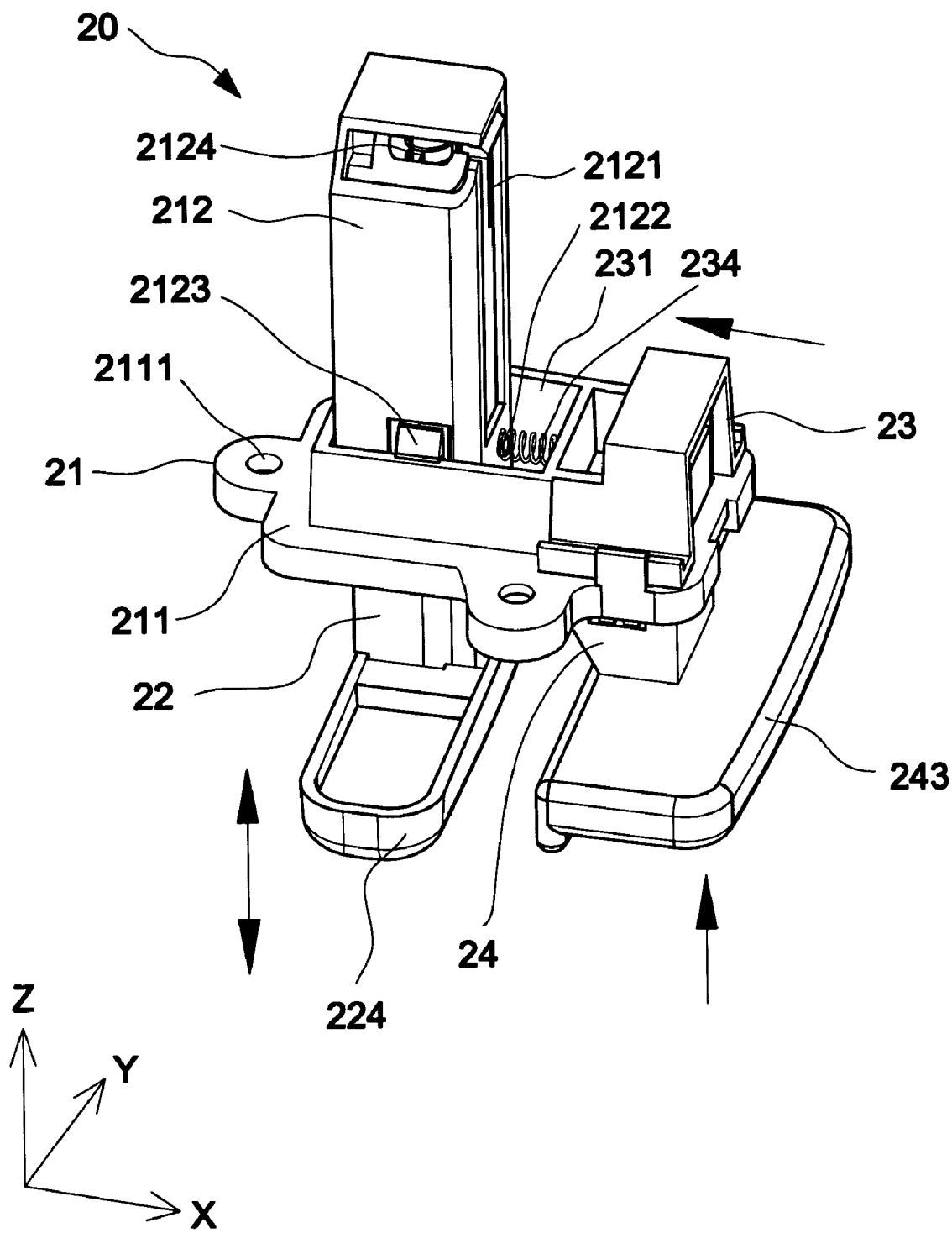
FIG. 4 is a perspective view showing the adjusting structure of the projector according to the present invention.
Figure 5:
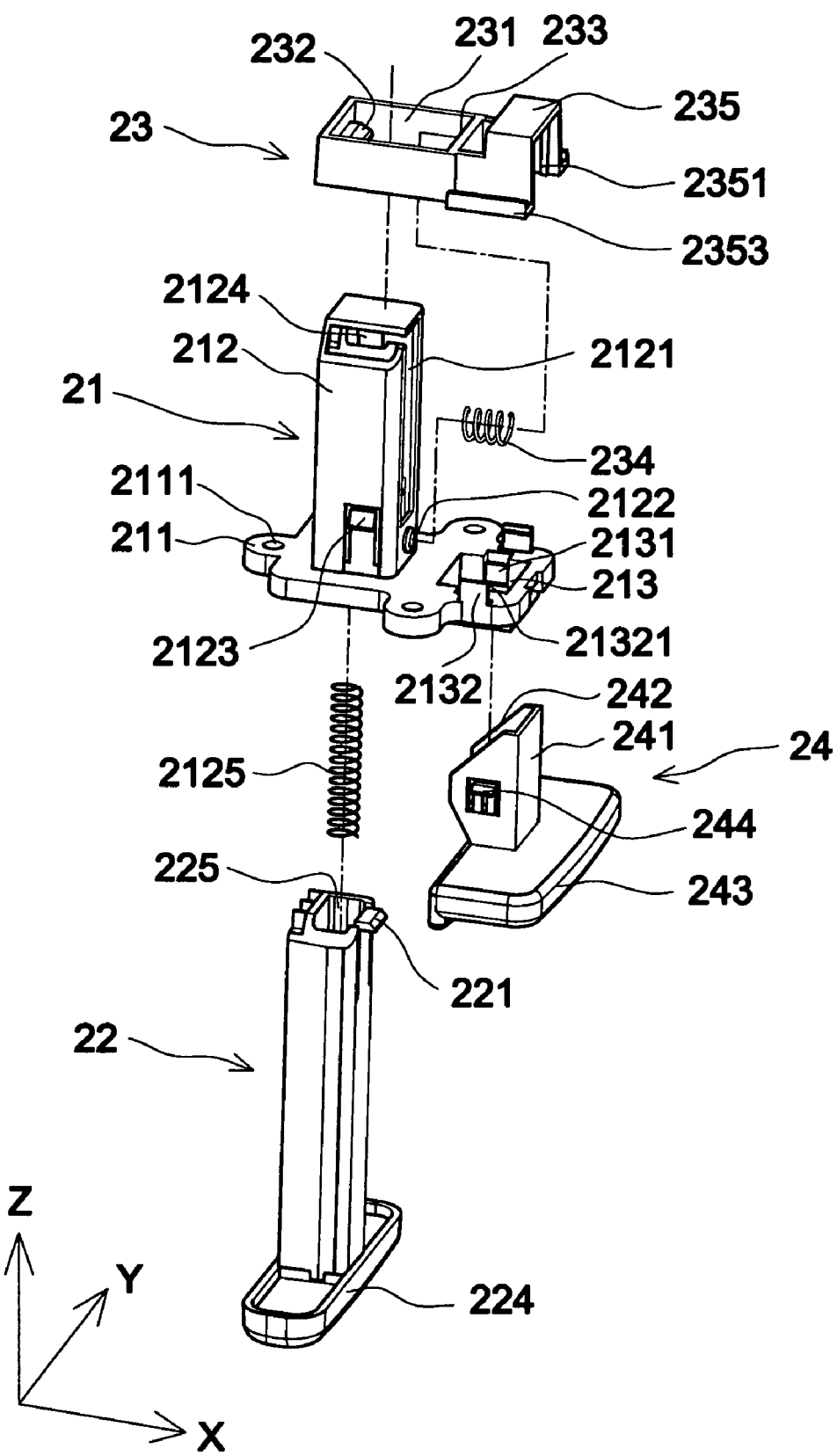
FIG. 5 is an exploded view showing the adjusting structure of the projector according to the present invention.

Please refer to FIG. 3, an adjusting structure 20 of a projector according to the present invention protrudes from the bottom of a projector 1 to support the projector 1, and please refer to FIG. 4 and FIG. 5, wherein the adjusting structure 20 includes a base 21, a foot member 22, a slider 23 and a controller 24.

The base 21 includes a main body 211; a sleeve 212 is vertically disposed on the main body 211 and a hole 213 is opened on the main body 211. A plurality of fixed holes 2111 is disposed on the main body 211, in order to fix and connect the main body 211 to the bottom of the projector 1. A first groove 2121 parallel to the z-axis is opened on one side of the sleeve 212, and a first fixed stud 2122 is protruded below the first groove 2121 along the x-axis. A guiding member 2123 is protruded at the bottom of the front surface and the rear surface of the sleeve 212, and the guiding member 2123 can be elastically deformed when a force along the y-axis is applied thereon. A second fixed stud 2124 is vertically installed on the inside top of the sleeve 212 for fixing one end of an elastic member 2125 (i.e. a spring). A pair of second grooves 2131 parallel to the z-axis is opened on the inside of the hole 213. The fixed plate 2132 is vertically upward disposed on the outside of the second groove 2131, and the free end of the fixed plate 2132 bends toward the inside of the fixed plate 2132 and is provided with a blocking plate 21321.

Figure 6:
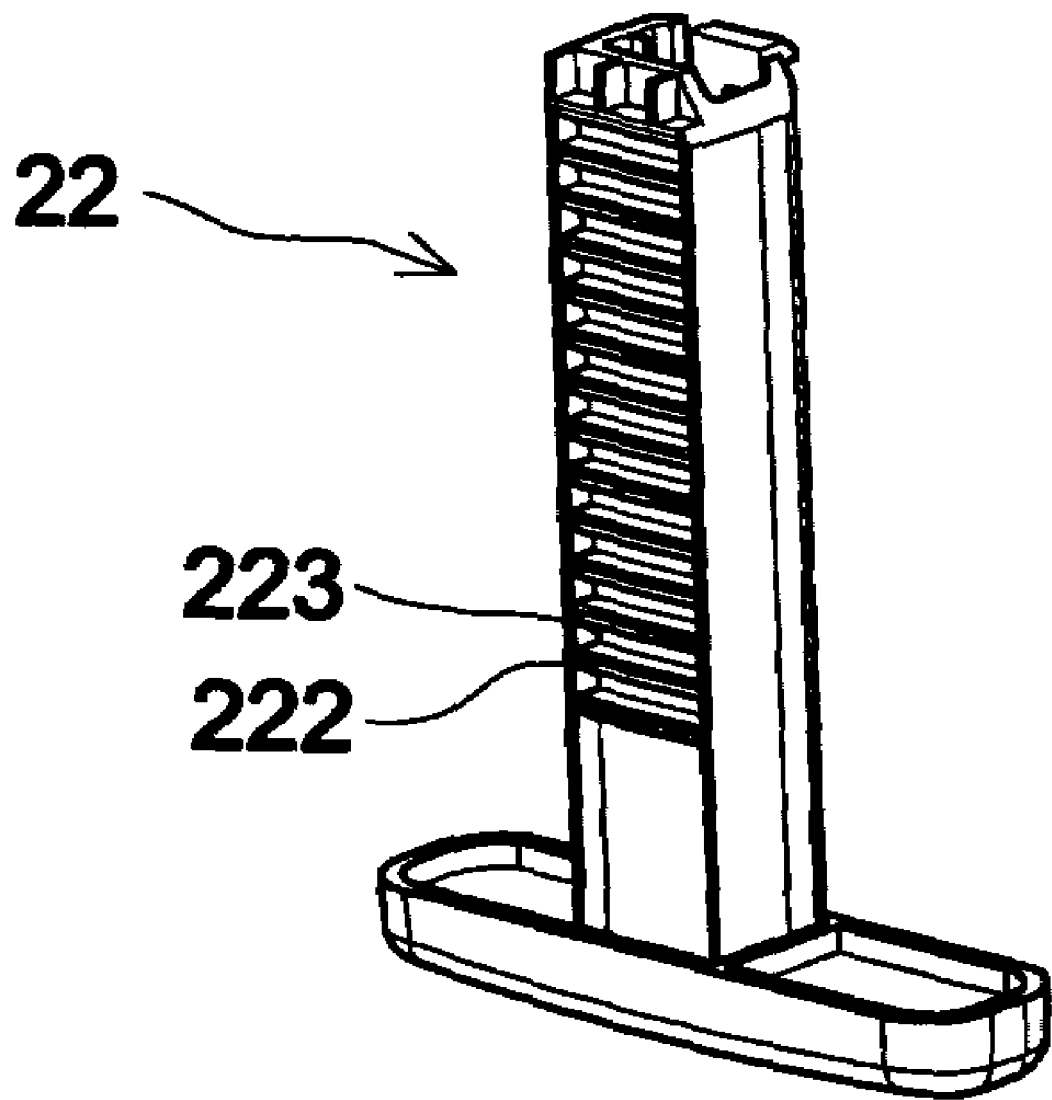
FIG. 6 is a perspective view showing the foot member of the present invention.

The foot member 22 is sleeved in the sleeve 212, and a guiding member 221 is protruded from the upper end of the lateral side of the foot member 22 and facing the first groove 2121. The guiding member 221 can be deformed when applied a force along the x-axis. A plurality of protruding members 222 is disposed on one side of the guiding member 221 in a proper distance along the z-axis (as shown in FIG. 6) in order to form grooves 223 parallel to the y-axis among the protruding members 222. A foot part 224 is disposed at the bottom of the foot member 22 for supporting on a desk (not shown in the figs). In addition, a container groove 225 is opened on the top center of the foot member 22 for containing the elastic member 2125, and one end of the elastic member 2125 presses against the inside bottom of the container groove 225.

The slider 23 is disposed on the base 21, and has an opening 231 for the sleeve 212 to pass through. The top edge of the opening 231 is confined to the bottom of the guiding member 2123. A blocker 232 is disposed on the inside of the opening 231 opposite to the protruding members 222, and an elastic member 234 is disposed on the other inside 233 of the opening opposite to the first fixed stud 2122. One end of the elastic member 234 is fixed to the first fixed stud 2122 of the sleeve 212, and the other end presses against the inside 233. The deformation direction of the elastic member 234 is parallel to the moving direction of the slider 23. The back of the inside 233 is connected to a pushing member 235, and the bottom of the pushing member 235 is provided with a container groove 2351. The inside bottom of the container groove 2351 is extended upward to form a inclined plane 2352, and the two sides of the pushing member 235 opposite to the blocking plate 21321 are provided with a pair of wings 2353, therefore, after the slider 23 and the base 21 are connected, the blocking plate 21321 can press the wings 2353 to confine the slider 23 to move along the y-axis and the z-axis.

The controller 24 passes through the hole 213 of the base 21, and presses against the inclined plane of the slider 23. The controller 24 has a stud body 241, and an inclined part 242 in coordination with the inclined plane 2352 of the container groove 2351 is disposed on the top of the stud body 241, in order to make the inclined part 242 pressing against the inclined plane 2352 of the container groove 2351. A pressing member 243 is disposed on the bottom of the stud body 241, and an elastic guiding member 244 is protruded on one side of the body 241 opposite to the second groove 2131 of the base 21, so as to guide and confine the controller 24 to move along the second groove 2131 in the z-axis direction.

The assembly steps are as follows, first, sleeve the slider 23 with the base 21 from the bottom of the slider 23. The guiding member 2123 and the blocking plate 21321 press the top edge of the opening 231 of the slider 23 and the wings 2353 to be fixed. Then, one end of the elastic member 234 is fixed to the first stud 2122 and the other end presses against the inside 233 of the opening 231. And then, another elastic member 2125 is installed in the sleeve 212. The foot member 22 passes through the sleeve 212 to make the guiding member 221 installed in and connected with the first groove 2121. The controller 24 is pressed into the hole 213 from the bottom of the base 21, in order to make the inclined part 242 pressing against the inclined plane 2352 of the slider 23, for assembling the adjusting structure 20 of the invention. At last, the adjusting structure 20 is installed in the predetermined opening on the bottom of the projector 1 (not shown in the figs), and the adjusting structure 20 is fixed on the bottom of the projector 1 by means of the fixed hole 2111 for completing the assembly. Because the guiding member 2123, 221 and 224 disposed respectively on the sleeve 212, foot member 22 and the controller 24 are elastically deformable when pressed, the guiding members are pressed into the member to be assembled (i.e. grooves) by applying a force, and return back to be fixed when the force is eliminated (i.e. the guiding members are in the grooves), so as to make the assembly steps fast and convenient.

Figure 7A:
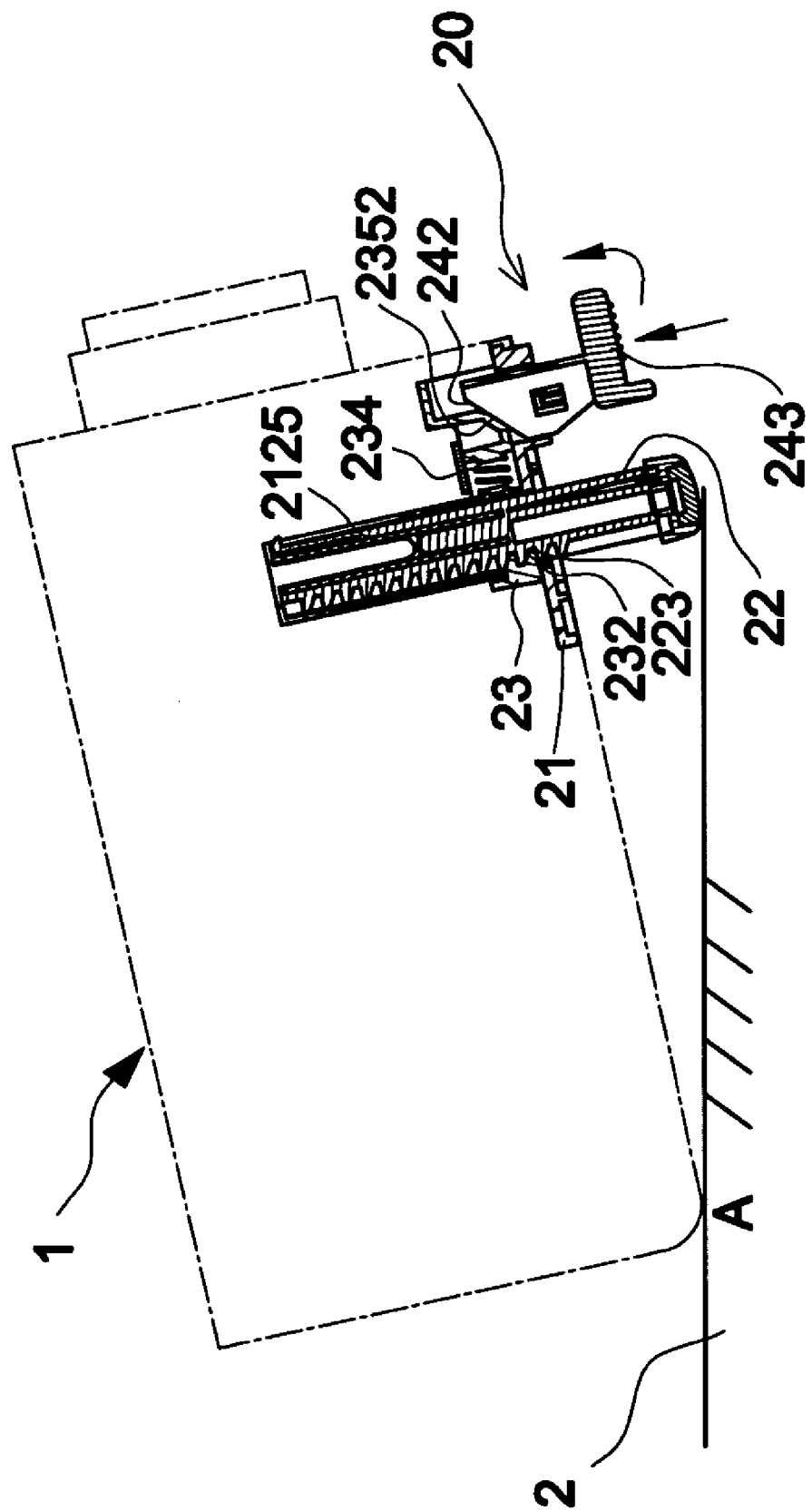
FIG. 7A, FIG. 7B, FIG. 7C and FIG. 7D illustrate the operation of the adjusting structure of the projector according to the present invention.
Figure 7B:
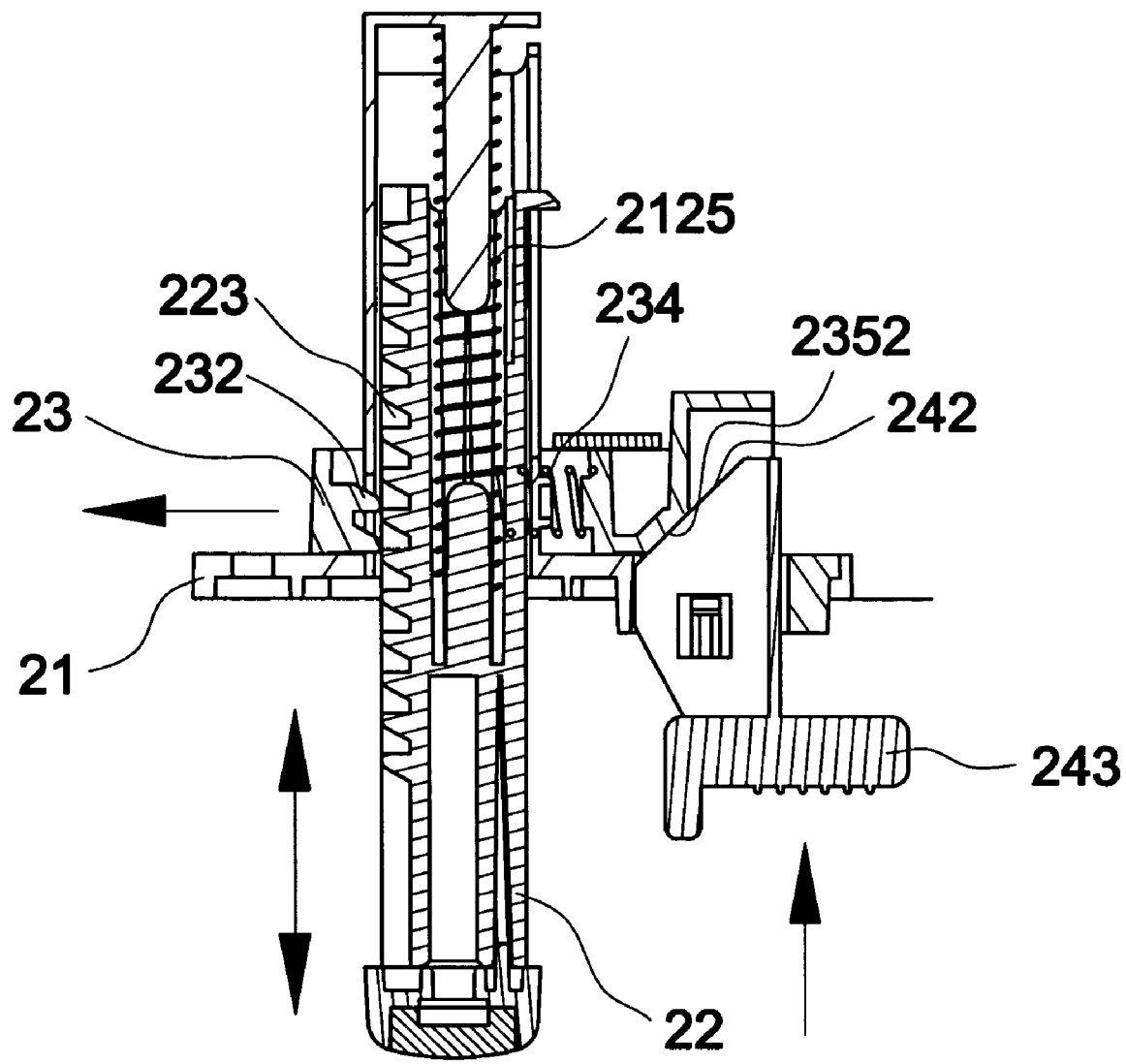
Figure 7C:
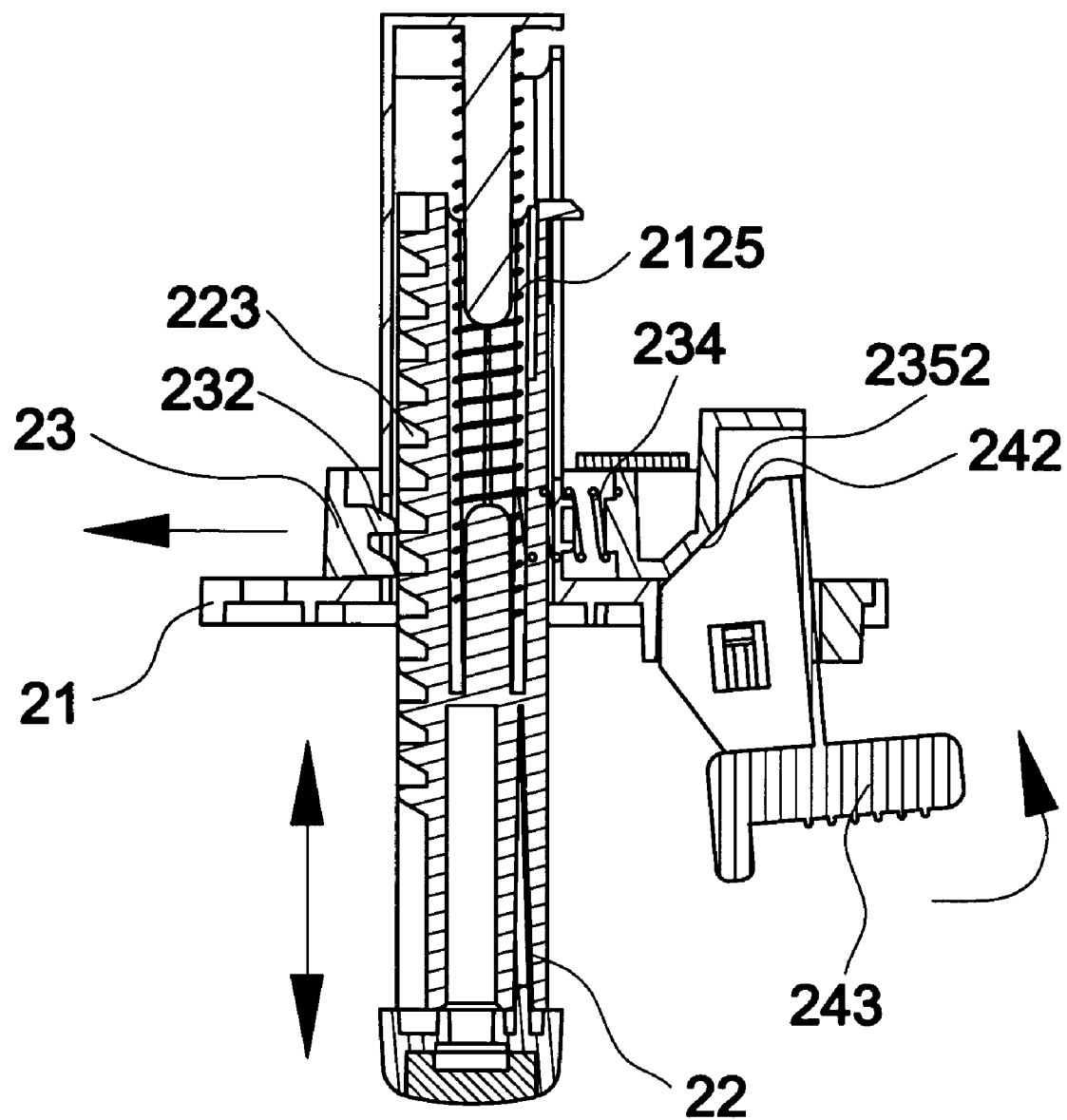
Figure 7D:
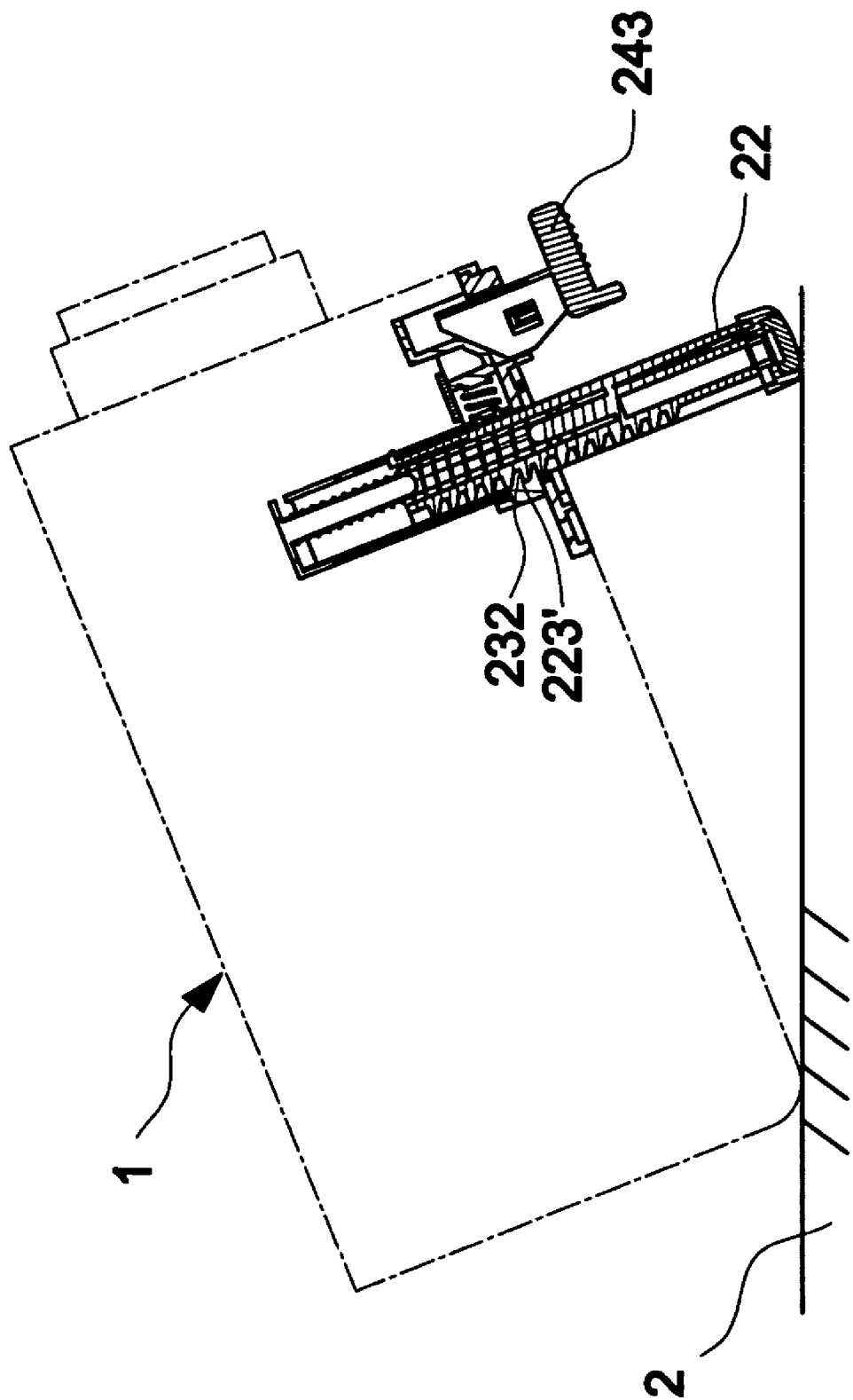

Please refer to FIG. 7A for the operation manner of the adjusting structure 20 of the invention. One end of the projector 1 is supported on the table 2, and the other end thereof is supported on the table by means of the foot member 22 in order to make the projector 1 inclined upward for a certain angle. When the adjusting structure 20 is at the initial state, the blocker 232 is wedged in the groove 232. When a user presses the pressing member 243 upward form the bottom of the projector 1 (as shown in FIG. 7B), or moves the pressing member 243 outward (as shown in FIG. 7C), the inclined part 242 is led to move upward (along the z-axis). Meanwhile, the inclined part 242 pushes the inclined plane 2352, causing the slider 23 which is confined not to move along the z-axis and the y-axis to move along the x-axis and press the elastic member 234, resulting in that the blocker 232 moves and is separated from the groove 233 in a parallel direction (as shown in FIG. 7B and FIG. 7C), making the foot member 22 able to move freely subject to the elastic force of the elastic member 2125. At this time, one end of the projector 1 supported on the table 2 works as a pivot A, and the user moves the projector 1 upward or downward by one end of the pressing member 243, so as to adjust the height of the foot member 22 to make images projected on the proper location of the screen (not shown in the figs). After the adjustment, the pressing member 243 is released, and the slider 23 subject to the elastic force of the elastic member 234 returns to fix the blocker 232 in a different groove 223' (as shown in FIG. 7D). Utilizing the steps mentioned above to adjust the height of the projector, the images from the projector can be projected precisely on the screen.

Therefore, because the controller 24 presses the inclined plane 2352 of the slider 23 to push the slider 23 confined to the blocking plate 21321 and the guiding member 2125, the slider moves along only one direction (x-axis), so as to make the blocker 232 separated from the groove 223 in a parallel direction. Therefore, when the user presser the different places on the pressing member 243, causing the inclined part 242 pressing against different locations on the inclined plane 2352, because the slider 23 is confined to the y-axis and the z-axis, the inclined plane 2352 pushed by the inclined part 242 can only force the slider 23 to move alone the x-axis in a parallel direction, making the blocker 232 maintained to be separated from the groove 223 in a parallel direction, in order to avoid the one-sided inclination.

Furthermore, the pressing member 243 is disposed below of the projector 1, which makes both the moving direction of pressing the controller 24 and that of the projector 1 to be the same. When one finger of a hand presses the pressing member 243, other fingers can hold the upper of the projector and provide a proper supporting force, so as to save efforts and control more easily and conveniently.

In addition, the user only needs to press the controller 24, and then the projector can slide upward or downward relative to the foot member 22, in order to achieve the adjustment of the height of the projector. Therefore, it is convenient to operate, and because sliding instead of rotating the threaded shaft in the conventional way makes the adjustment, the adjusting speed can be faster.

While a preferred embodiment of the present invention have been described herein for the purpose of illustration, many modifications and changes will become apparent to those skilled in the art. Accordingly, the appended claims are intended to encompass all such modifications and changes as fall within the true spirit and scope of this invention.

What is claimed is:

1. An adjusting structure of a projector, comprising:
   a base, fixed at the bottom of a projector;
   a slider, disposed on the base and having an opening, a blocker being disposed on the inside of said opening and one end thereof being disposed a pushing member, an inclined plane being disposed at the bottom of said pushing member;
   a foot member, installed through said opening and one side thereof is disposed a plurality of grooves, the other side thereof is disposed an elastic member, in order to make said blocker fixed in said groove; and
   a controller, connected to said pushing member, one top thereof is disposed an inclined part in coordination with said inclined plane,
   wherein said base further comprises a sleeve, said foot member being installed through said sleeve, an elastic member being between said sleeve and said foot member.

2. The adjusting structure of a projector according to claim 1, wherein said plurality of grooves is disposed along the moving direction of said foot member, every said groove being perpendicular to said moving direction of said foot member.

3. The adjusting structure of a projector according to claim 1, wherein one end corresponding to said sleeve and said foot member is respectively disposed grooves and a guiding member.

4. The adjusting structure of a projector according to claim 1, wherein the moving direction of said controller is parallel to said foot member.

5. The adjusting structure of a projector according to claim 1, wherein said controller further comprises a pressing member, said pressing member being disposed below said projector.

6. The adjusting structure of a projector according to claim 1, wherein the moving direction of said slider is perpendicular to said foot member.

7. The adjusting structure of a projector according to claim 1, wherein said base is disposed a guiding member and a blocking plate to guide the slider to move along a single direction.

* * * * *